July 29, 1952     M. TIBBETTS     2,604,962
MOTOR VEHICLE CONTROL MECHANISM
Filed Jan. 22, 1948
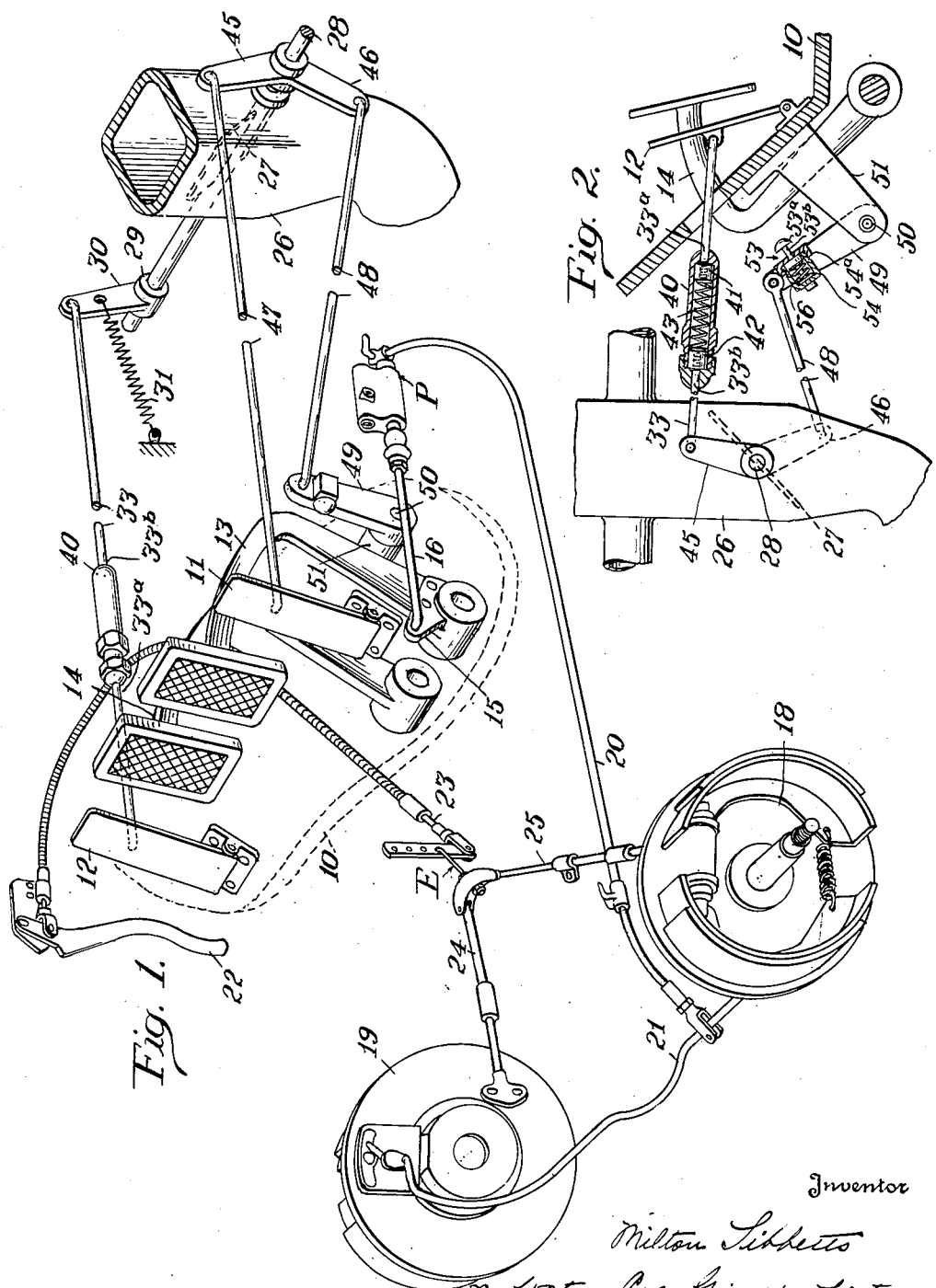
Inventor
Milton Tibbetts
By Watson, Cole, Grindle & Watson
Attorneys.

Patented July 29, 1952

2,604,962

UNITED STATES PATENT OFFICE 2,604,962

MOTOR VEHICLE CONTROL MECHANISM

Milton Tibbetts, Detroit, Mich., assignor to Packard Motor Car Company, Detroit, Mich., a corporation of Michigan Application January 22, 1948, Serial No. 3,769

2 Claims. (Cl. 192—3)

It has heretofore been proposed that the fatigue which is often experienced by drivers of motor vehicles on trips of long duration may be lessened by the provision of a second throttle control pedal, accessible to and operable by the left foot of the driver, in addition to the conventional throttle control pedal which is universally placed close to the brake pedal and which, as well as the brake pedal, are adapted to be actuated by the operator's right foot. The present invention relates particularly to a motor vehicle control mechanism which is designed and constructed in such manner as to minimize driving fatigue and contemplates the provision, for this purpose, of two throttle control pedals, one to be engaged and actuated by the driver's right foot and the second by his left foot, the mechanism being so designed and constructed, however, that the presence of the second throttle control pedal imparts no increased element of danger.

In the conventional control mechanism, including only a throttle control pedal positioned to be operated by the operator's right foot, the operator can use that foot to operate either the brake or to move the throttle toward open position. He cannot simultaneously open the throttle and apply the brake with one and the same foot. In any control mechanism involving the use of a throttle actuating pedal which may be reached and actuated by the operator's left foot it may happen that, in an emergency, the operator will instinctively press forward simultaneously with both feet, especially those operators who are accustomed, in stopping vehicles, to press a clutch pedal with the left foot and brake pedal with the right foot. Obviously the opening of the throttle simultaneously with the actuation of the brakes would tend to prevent maximum deceleration of the vehicle and might well cause a serious accident which would otherwise be avoidable.

The present invention contemplates a control mechanism which includes a brake pedal and right and left throttle control pedals, the several devices by means of which the throttle control pedals are connected to the throttle, and the brake control pedal is connected to the brakes, however, being so designed and constructed that simultaneous opening of the throttle by the left foot and application of the brakes by the right foot is made impossible. Thus the mechanical connection between that pedal which is adapted to be actuated by the left foot, and the throttle, is made yieldable and becomes ineffective as an operating connection when the brake pedal is depressed.

Ordinarily the throttle will respond to and be under the complete control of the operator's left foot so that he may use that foot and rest his right foot. Should an emergency occur, however, and the operator forceably depresses the brake pedal the throttle must of necessity be closed even though the throttle pedal is still depressed by the operator's left foot. Conversely, when the brake pedal is depressed, the throttle cannot be opened by depression of the left throttle actuating pedal since the throttle is maintained in closed position by mechanism actuated by the brake pedal, the action of which mechanism cannot be overcome by any action produced by movement of the left throttle pedal.

It will be appreciated that it is sometimes necessary for the operator of a motor vehicle to open the throttle, engage the clutch, and release the brake substantially simultaneously, as when the vehicle has been stopped on an upgrade and forward movement must again be initiated. If these several operations are to be accomplished at about the same time, some means other than the usual foot pressure operated brake must be employed to hold the car stationary while the throttle is being opened since the operator's left foot is engaged in releasing the clutch and his right foot can be used to release the brake, or to depress the right accelerator pedal, but cannot perform both such operations at one time. Such additional means may comprise a hand operated brake of known type, such brake not being connected in any way to the throttle, and operable when desired without causing any throttle movement. When such a means is provided it is then a simple matter for the operator to start the vehicle upon an upgrade. When the vehicle comes to rest the hand brake is set to prevent retrograde movement. When it is to again move forward the operator will release the hand brake with his left hand, release the clutch with his left foot, and open the throttle with his right foot. These three operations may thus be accomplished simultaneously and a smooth start uphill effected.

The invention is of great utility when incorporated in a motor vehicle having an automatically shifting transmission mechanism. Where such a transmission is utilized the conventional clutch pedal is not needed and is dispensed with, only three foot operated pedals being required, i. e. right and left throttle control pedals and a brake pedal intermediate these. The mechanical connection between the left throttle control pedal and the throttle is yieldable, as before, and mechanism is provided for ensuring closure of the throttle valve when the brake pedal is depressed, regardless of the position of the left accelerator pedal. When such an arrangement is utilized the vehicle operator is enabled to control the throttle by manipulating the left throttle control pedal with his left foot while maintaining his right foot in position to immediately depress the brake pedal. As a result he may bring about immediate stoppage of the vehicle by depressing the brake pedal, the time normally consumed in transferring the right foot from the accelerator pedal to the brake pedal being saved. When the vehicle is travelling at high speed it is, of course, important that the brakes be applied promptly when need arises and it is quite helpful to avoid loss of even the very small amount of time involved in the transfer of a foot from one pedal to another.

Various specific mechanisms for carrying out the objectives of the invention may be devised and in the accompanying drawings one such mechanism is disclosed by way of example.

In the drawings:

Figure 1 illustrates, diagrammatically, one arrangement of operating pedals and braking means such as contemplated by the invention; and Figure 2 is a vertical section through portion of the floor of a motor vehicle, taken longitudinally of the vehicle, showing certain of the elements illustrated in Figure 1.

A small portion of the floor of a motor vehicle of any current type is indicated at 10 in the drawings, the throttle actuating pedal to be operated by the right foot of the driver being indicated at 11, the left throttle operating pedal at 12, the service brake pedal at 13 and a clutch pedal at 14, the term "pedal" here being used to designate the unit which comprises both the plate to be engaged by the foot and the arm which supports this plate. It will be understood that the pedal 14 may be omitted when a transmission of the automatically shifting type is employed, as previously explained, or may be employed to operate a parking brake of the type which may be released by hand. The brake pedal 13 is supported for rocking movement about a fixed axis extending transversely of the machine and an arm 15 rigidly attached thereto is operatively connected by a thrust rod 16 to the plunger of a fluid pump P which when actuated transmits fluid under pressure to the service brakes located at the vehicle wheels. Two such brakes are indicated at 18 and 19, respectively, and fluid conduits at 20 and 21, the details of the hydraulic braking system not being shown. Any effective brake operating means may be employed, if capable of foot pedal actuation. The parking brake mechanism diagrammatically illustrated includes the hand lever 22, cable 23, equalizer E and cables 24 and 25 connecting the equalizer and brakes, respectively, and here also minor details are omitted inasmuch as any mechanism which includes a hand releasing means may be employed. There is no interconnection between this braking mechanism and the throttle.

The engine of the vehicle includes a fuel mixture manifold a small section of which is shown, being indicated at 26, and a throttle valve member indicated at 27, throttle member 27 being rigidly mounted upon a shaft 28 extending horizontally through the manifold 26. Fixed on shaft 28 is a sleeve 29 having an arm 30 to which there may be connected a tension spring diagrammatically illustrated at 31 for normally maintaining the arm 30 in the position in which it is shown in the drawings, with the throttle 27 in closed position. The outer end of arm 30 is connected by means of a link 33 to the left throttle control pedal 12. Link 33 is of novel construction in that it includes means which permits it to shorten in the event that the pedal 12 is depressed at a time when the arm 30 is held against movement, or, alternatively, when arm 30 is rocked in a counterclockwise direction (Figure 1) while pedal 12 is in depressed position.

This means includes the cylindrical two part spring case 40 through aligned apertures in the ends of which the two portions 33a and 33b of the link 33 slidably project. Threaded upon the end of link portion 33a is a spring abutment in the nature of a short cylindrical member 41 and a similar member 42 is threaded upon the end of link portion 33b which lies within casing 40. Housed within the casing 40 is a helical compression spring 43 the ends of this spring bearing at all times against the slidable spring abutments 41 and 42. Spring 43 is of such strength as to normally maintain the spring abutments 41 and 42 in the positions in which they are shown in Figure 2 of the drawings, and the link 33 as a whole therefore extended to its maximum length, and will only yield to permit the link to shorten when a superior pressure is applied.

Also rigidly mounted upon shaft 28 is a lever having an upwardly extending arm 45 and a downwardly extending arm 46. A link 47 connects the upper end of arm 45 to the throttle control pedal 11, adapted to be manipulated by the right foot of the vehicle operator, and the lower end of arm 46 is connected by means of a link 48 with the upper end of an arm 49 mounted for rotation about the axis of a shaft 50 supported in brackets one of which is indicated at 51, these brackets being fixed to the undersurface of the floor board 10. It will be observed that this arrangement is such that depression of pedal 11 will open the throttle 27 and that movement of arm 49 in a clockwise direction (Figure 1), or in a counterclockwise direction (Figure 2), will cause closure of the throttle.

Mounted upon arm 49 and in position to be engaged by the arm of brake pedal 13 when the pedal is depressed is an abutment member 53. This abutment member comprises a rounded head 53a and a stem 53b, stem 53b extending through aligned apertures formed in the bottom of a short cylindrical spring housing 54 and in the cover 54a of that housing, respectively, and thus being slidable axially with respect to the spring housing and movable bodily with respect to the lever arm 49. A relatively stiff spring 56 is enclosed within the spring housing one end of this spring abutting against the end of the cylindrical casing 54 and the other end against a circular flange 53d rigid with the stem 53b of the movable member. Spring 56 normally functions to maintain the head 53a of the abutment member in the position in which it is shown in full lines in Figure 2 but depression of the head 53a may occur in the event that downward movement of the pedal 13 continues after the throttle has reached fully closed position. Breakage or straining of any of the parts due to extended movement of the pedal 13 is thus avoided.

In the operation of a vehicle equipped with the mechanism described the operator will have, under normal running conditions, the option of operating the throttle either with his right foot, through pedal 11 and its connections, or with his left foot through pedal 12 and the described elements connecting that pedal and the throttle. The brake pedal 13 will, of course, be operated by the driver with his right foot in conventional manner whenever it is desired to stop the vehicle. Depression of the brake operating pedal 13 causes it to contact the head 53a of the abutment member and to effect closure of the throttle, regardless of the position of the left throttle control pedal 12. Ordinarily the spring 56 will not be flexed but, should the brake pedal 13 have a movement which is longer than that which will just effect closure of the throttle, such movement may occur without straining or breaking the throttle or the linkage connecting the arm 49 and the throttle. Should the operator simultaneously depress the brake pedal 13 and the accelerator pedal 12, however, the throttle will be moved to closed position by the action of the brake pedal and the spring 43 will be compressed to permit the two sections 33a and 33b of the link 33 to approach each other and thus prevent breakage of this link or other injury to the mechanism. Conversely, once the brake pedal has been depressed and the brakes applied, application of foot pressure to the pedal 12 will have no effect upon the throttle, spring abutment 41 moving toward spring abutment 42 and the intermediate spring being compressed. Naturally, spring 43 is superior in strength to the relatively light tension spring 31 and, as previously stated, the relatively stiff spring 56 is superior in strength to spring 43 as well as superior in strength to return spring 31.

As explained previously, the invention may be incorporated in motor vehicles which have automatically shifting transmissions as well as those equipped with manually operable clutches. If the clutch pedal is dispensed with the operator will need to actuate only two pedals, i. e. the brake pedal and either the right or the left throttle control pedal, in the control of the vehicle under ordinary circumstances. When it is necessary to start the vehicle after it has come to rest on an upgrade the hand released parking brake must also be utilized since the throttle may not be opened while the brake operating foot pedal is depressed. When the improved control mechanism is employed the motor vehicle operator may drive for lengthy periods of time with less fatigue and greater safety than would be possible if conventional controls only were available. The improved control mechanism will also be most helpful to those who, for one reason or another, prefer to use the left foot to operate the throttle control pedal.

It will be appreciated that the mechanism illustrated is set forth by way of example and that others may be devised and employed without departure from the invention. The braking means may be of any suitable type, either manually operable or provided with a servo-mechanism responsive to the movement of the pedal for actually applying the braking power. The connections between the throttle and throttle actuating pedals may be modified substantially if desired, for instance to include means actuated by vacuum, air pressure or hydraulic pressure, all within the import of the invention.

Having thus described the invention, what is claimed as new and desired to be secured by Letters Patent is:

1. In a motor vehicle, in combination, controls therefor including a clutch pedal and a brake pedal mounted side by side for convenient operation by the left foot and the right foot of the operator of the vehicle, respectively, two laterally spaced accelerator pedals mounted outwardly of said clutch and brake pedals, respectively, one for convenient operation by the right foot of the operator and the other for convenient operation by the left foot of the operator, an engine throttle, a rigid connection from the said right foot accelerator pedal to said engine throttle, means for preventing operation of said engine throttle by said left foot accelerator pedal when said brake pedal is depressed comprising a separate yieldable connection from the said left foot accelerator pedal to said engine throttle, and means connecting said brake pedal rigidly to said engine throttle insuring positive closing of said engine throttle upon depression of said brake pedal.

2. In a motor vehicle, in combination, controls therefor including a clutch pedal and a brake pedal mounted side by side for convenient operation by the left foot and the right foot of the operator of the vehicle, respectively, two laterally spaced accelerator pedals mounted outwardly of said clutch and brake pedals, respectively, one for convenient operation by the right foot of the operator and the other for convenient operation by the left foot of the operator, an engine throttle, a rigid connection from the said right foot accelerator pedal to said engine throttle, means for preventing operation of said engine throttle by said left foot accelerator pedal when said brake pedal is depressed comprising a separate yieldable connection from the said left foot accelerator pedal to said engine throttle, means connecting said brake pedal rigidly to said engine throttle insuring positive closing of said engine throttle upon depression of said brake pedal, said yieldable connection comprising a two part link, means normally urging said parts in opposite directions, and means limiting the movement of said parts away from each other while maintaining them in a substantial alignment.

MILTON TIBBETTS.

REFERENCES CITED

The following references are of record in the file of this patent:

UNITED STATES PATENTS

| Number | Name | Date |
| --- | --- | --- |
| 1,174,981 | Hess | Mar. 14, 1916 |
| 1,843,090 | Ajdukovich | Jan. 26, 1932 |
| 1,897,358 | Bellis | Feb. 14, 1933 |
| 2,033,433 | Leupold | Mar. 10, 1936 |
| 2,065,354 | Streen | Dec. 22, 1936 |
| 2,071,013 | Ajdukovich | Feb. 16, 1937 |
| 2,204,265 | Wentzel | June 11, 1940 |
| 2,302,085 | Wolfe | Nov. 17, 1942 |
| 2,317,935 | Myerson | Apr. 27, 1943 |
| 2,453,054 | Whiffen | Nov. 2, 1948 |